United States Patent
Fasbender et al.

(10) Patent No.: US 7,170,079 B2
(45) Date of Patent: Jan. 30, 2007

(54) METHOD OF READING OUT INFORMATION ITEMS STORED IN A PHOSPHOR LAYER

(75) Inventors: Robert Fasbender, Ottobrunn (DE); Herbert Gebele, Sauerlach (DE); Michael Weinberger, Altenmünster (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 301 days.

(21) Appl. No.: 10/915,908

(22) Filed: Aug. 11, 2004

(65) Prior Publication Data
US 2005/0035316 A1 Feb. 17, 2005

(30) Foreign Application Priority Data
Aug. 12, 2003 (EP) ................................. 03102512

(51) Int. Cl.
*G01T 1/105* (2006.01)
*G03B 42/08* (2006.01)

(52) U.S. Cl. ..................................... 250/586
(58) Field of Classification Search ................ 250/586, 250/580
See application file for complete search history.

(56) References Cited

U.S. PATENT DOCUMENTS

| | | | |
|---|---|---|---|
| 5,864,362 A * | 1/1999 | Cutler | ............................ 348/96 |
| 6,369,402 B1 | 4/2002 | Gebele et al. | |
| 6,373,074 B1 | 4/2002 | Zehetmaier et al. | |
| 6,642,535 B2 | 11/2003 | Gebele et al. | |
| 6,693,269 B2 * | 2/2004 | Shimizu et al. | ........... 250/208.1 |
| 6,858,861 B2 | 2/2005 | Gebele et al. | |
| 7,109,496 B2 | 9/2006 | Gebele et al. | |
| 2001/0012386 A1 * | 8/2001 | Struye et al. | ................ 382/131 |
| 2002/0043625 A1 * | 4/2002 | Shimizu et al. | ........... 250/458.1 |
| 2003/0042445 A1 * | 3/2003 | Mitchell et al. | ............. 250/584 |
| 2003/0057389 A1 | 3/2003 | Gebele et al. | |
| 2003/0111620 A1 | 6/2003 | Muller et al. | |
| 2005/0092943 A1 * | 5/2005 | Nitsche et al. | ............... 250/586 |
| 2005/0219534 A1 * | 10/2005 | Makino | ....................... 356/417 |

FOREIGN PATENT DOCUMENTS

EP 03 10 2512 1/2004

OTHER PUBLICATIONS

Schactzing et al., "New High-Speed Scanning Technique for Computed Radiography", 2002, pp. 511-520.

* cited by examiner

*Primary Examiner*—Otilia Gabor
(74) *Attorney, Agent, or Firm*—Houston Eliseeva LLP

(57) ABSTRACT

The invention relates to a method of reading out information items stored in a phosphor layer, in which the phosphor layer is excited to emit emission light and the emission light is sensed by a detector and the detector is moved relative to the phosphor layer. During this process, the detector consecutively senses the emission light emitted in each case by individual regions of the phosphor layer. To reduce the dark noise and the movement blur, provision is made that the detector senses the emission light emitted by a region during an integration time that is less than a forward-travel time for the movement of the detector by the width of the region in the forward-travel direction (V).

22 Claims, 2 Drawing Sheets

METHOD OF READING OUT INFORMATION ITEMS STORED IN A PHOSPHOR LAYER

FIELD OF THE INVENTION

The present invention relates to a method of reading out information items stored in a phosphor layer.

BACKGROUND OF THE INVENTION

Methods according to the generic kind are used, in particular for medical purposes, in the field of computer radiography (CR). In this connection, X-ray pictures are recorded in a phosphor layer by storing X-ray radiation passing through an object, for example a patient, as a latent image in the phosphor layer. To read out the stored image, the phosphor layer is irradiated with stimulation light and excited to emit emission light that is sensed by an optical detector and converted into electrical signals. If required, the electrical signals can be processed further and displayed on a monitor or outputted on a suitable output device, such as, for example, a printer.

EP 1 319 963 A1 describes a method in which a detector is driven in a forward-travel direction over a phosphor layer and, during this process, senses the emission light emitted by individual row-type regions of the phosphor layer. The emission light emitted by a row-type region is sensed during an adjustable integration time. The width of the row-type region is determined in the forward-travel direction by the integration time on the basis of the continuous forward travel of the detector during the integration time. In particular, a longer integration time is set at low intensities of the emission light in order to increase the width of the row-type regions. This can reduce the proportion of the so-called read-out noise in the detector signal and, consequently, improve the signal/noise ratio.

It has, however, been found that a longer integration time does not result in a better signal/noise ratio in all application cases. On the contrary, in certain cases, the noise may increase with integration time in relation to the signal of the sensed emission light, which results overall in a poorer signal/noise ratio.

Since the detector scans, while sensing the emission light during a longer integration time, a correspondingly wider region of the phosphor layer in the forward-travel direction than in the case of a shorter integration time, detailed information items are, in addition, lost within the region in the case of the method according to the prior art. This effect is also described as movement-induced blurring.

SUMMARY OF THE INVENTION

A first aspect of the invention provides a method of reading out information items stored in a phosphor layer in which the signal/noise ratio is improved and the movement-induced blurring is reduced. This aspect is achieved by a method wherein the detector senses the emission light emitted from a region during an integration time that is less than a forward-travel time for the movement of the detector by the width of the region in the forward-travel direction.

The invention is based on the idea of decoupling the sensing of the emission light from the forward travel of the detector such that the integration time for the light sensing is shortened with respect to the forward-travel time required for forward travel. In the course of the forward travel of the detector, the emission light emitted by a region is sensed during an integration time that is within the time interval needed for the forward travel. In this way, the width of the region to be read out, which is determined only by the forward-travel time of the detector, becomes independent of the integration time.

Surprisingly, the inventive method results in an improved signal/noise ratio, which may be explained by the following considerations:

In the case of the detectors normally used, such as, for example, CCD arrays or photodiode arrays, a so-called dark noise is superimposed on the actual detector signal as a measure of the emission-light intensity sensed.

The so-called read-out noise, which occurs once per detector element and read-out operation, forms a component of the dark noise. The prolonging of the integration time to improve the signal/noise ratio proposed in the prior art takes only this component of the dark noise into consideration.

The so-called thermally generated dark noise, which depends on the size of the detector elements, the temperature and the integration time of the detector, forms a further component of the dark noise. The shortening, according to the invention, of the integration time with respect to the forward-travel time reduces this component of the dark noise, an improved signal/noise ratio being achieved overall. This unexpected effect might be explained by the fact that the influence of the thermally generated dark noise on the signal/noise ratio is greater than the influence of the read-out noise.

The width of the regions read out in the forward-travel direction of the detector is determined in the case of the inventive method only by the forward-travel time and is not reduced, in contrast to the method disclosed in the prior art, by the shorter integration time. This does not increase the component of the read-out noise in the detector signal obtained for every individual region. Consequently, the influence of the read-out noise on the signal/noise ratio in the individual regions is not increased by the shorter integration time.

In addition, when sensing the emission light during the integration time, which is shorter, according to the invention, than the forward-travel time, the detector scans a correspondingly narrower portion of the phosphor layer than in the case of the methods disclosed in the prior art and in which the integration time is identical to the forward-travel time. This reduces losses of information due to movement-induced blurring.

To summarize, it may be stated that the inventive method improves the signal/noise ratio overall and, in doing so, reduces the movement-induced blurring at the same time.

In an embodiment of the method, provision is made that the phosphor layer in the region to be read out is irradiated during a stimulation time with stimulation light and, in this process, is excited to emit emission light. As a result of adjusting the stimulation time independently of the forward-travel time, the excitation time can be chosen independently of the time needed for the forward travel in such a way that the phosphor layer is optimally excited.

Preferably, the stimulation time is shorter than the forward-travel time. As a result, a narrower subregion of the region is irradiated with stimulation light. In this connection, the stimulation time may, however, be chosen in such a way that the stimulation light is also scattered in subregions of the region to be read out as a consequence of scattering processes in the phosphor layer, which subregions are not irradiated directly with the stimulation light during the stimulation time. These subregions are likewise thereby stimulated to emit emission light that can be detected during the integration time of the detector. This ensures that information stored in the subregions can also be sensed. Any loss of information is thereby avoided.

Preferably, the stimulation time is equal to the integration time. In this case, the integration time and stimulation time during the reading-out operation can be adjusted in a particularly simple way.

In a further advantageous refinement of the method, provision is made that a light source emitting stimulation light is moved relative to the phosphor layer, the individual regions of the phosphor layer being successively irradiated with stimulation light and excited to emit emission light. As a result, it is possible to move the light source together with the detector relative to the phosphor layer and to control the excitation of the emission light synchronously with its sensing in a simple way.

Preferably, the light source is controlled during this process in such a way that a first subregion of the region is irradiated with stimulation light and a second subregion of the region is excited by stimulation light scattered in the phosphor layer to emit emission light. By a suitable adjustment of the stimulation time, the result can then be achieved that both subregions cover the region to be read out completely and emit emission light, only the first subregion being irradiated directly with stimulation light and the second subregion, on the other hand, being excited indirectly by stimulation light scattered in the phosphor layer. Despite a stimulation time that is shorter than the forward-travel time for the movement of the light source over the region, this prevents a loss of information when the region is read out.

A further preferred refinement of the inventive method envisages that the detector and/or the light source is/are moved relative to the phosphor layer at a constant forward-travel speed. In this case, the forward-travel time is equal to the ratio of the width of the region and the forward-travel speed. The forward-travel time can be adjusted on the basis of this relationship in a simple way by setting the width of the region.

Preferably, the sensing of the emission light emitted by a region of the phosphor layer and/or the irradiation of the phosphor layer in an individual region is controlled by a pulsed signal, the integration time or the stimulation time being determined by the pulse width of the individual pulses of the pulsed signal. In particular, a cyclic pulsed signal is used for this purpose. Preferably, the pulses are rectangular pulses. The control of the sensing or stimulation of the emulsion light can be achieved in a simple way as a result.

In the case of control by means of a pulsed signal, it is preferable, in addition, that the forward-travel time is determined by the time duration between identical, i.e., rising or falling, edges of two consecutive pulses of the pulsed signal. In the case of a cyclic pulsed signal, this is the cycle time of the pulsed signal. The control of the integration time, stimulation time and forward-travel time is achieved in a simple way as a result.

It is preferable in addition that each of the individual regions of the phosphor layer has the form of a row, the detector and/or the light source being moved perpendicularly to the longitudinal extension of the row relative to the phosphor layer. In this way, all the information stored in a row of the phosphor layer is read at once within the set integration time in each case, as a result of which the phosphor layer can be read out particularly rapidly.

BRIEF DESCRIPTION OF THE DRAWINGS

Further features and advantages of the invention emerge from the following description of embodiments and application examples, reference being made to the accompanying drawings. In this connection, the representation of the embodiments is not true to scale.

In the drawings.

DETAILED DESCRIPTION OF THE INVENTION

Figure 1:
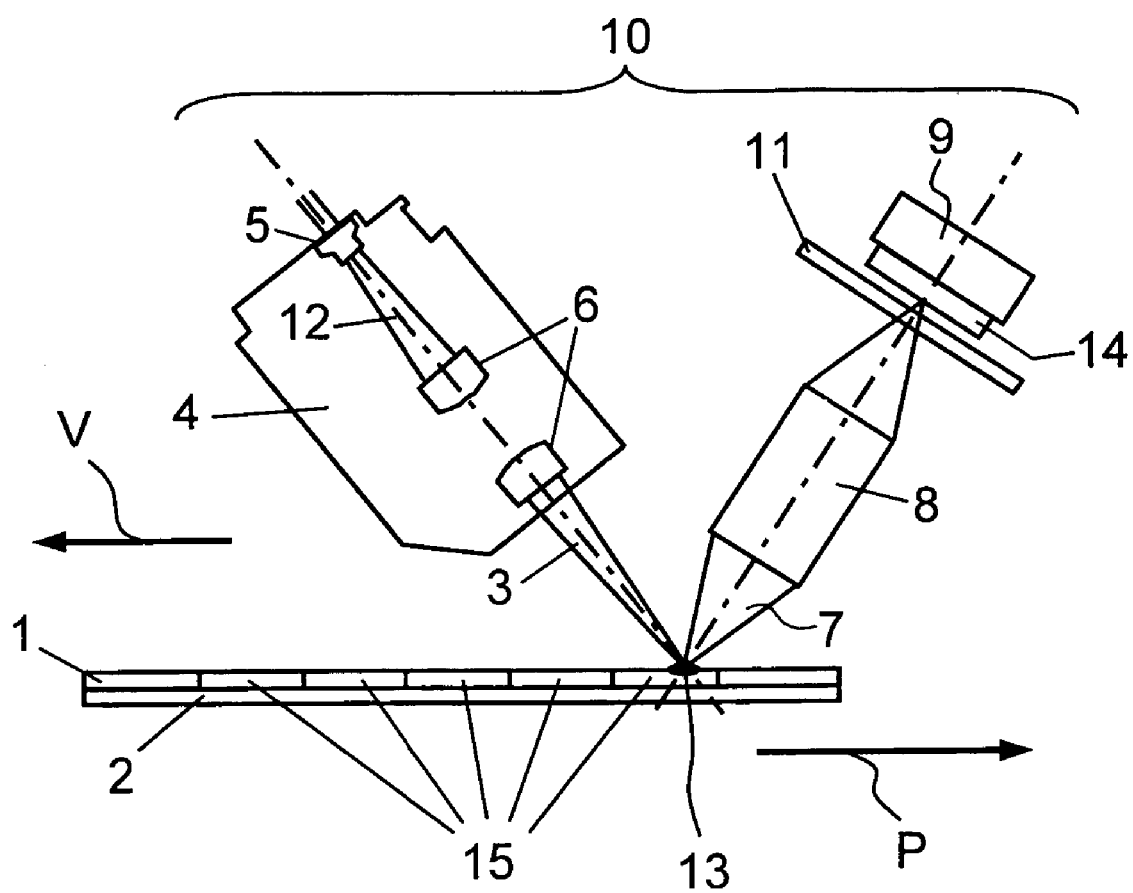
FIG. 1 shows a device for performing the inventive method.

FIG. 1 shows a device for performing the inventive method. A phosphor layer 1 to be read out is situated on a base layer 2 and is irradiated with stimulation light 3 that is generated by a light source 4. The emission light 7 excited by the stimulation light 3 in the phosphor layer 1 is sensed by a detector 9. The light source 4 and the detector 9, including an imaging unit 8 and an optical filter 11 together form the scanner 10, which is moved in the forward-travel direction V relative to the phosphor layer 1 during the reading-out.

The light source 4 comprises a plurality of individual radiation sources 5 and also a focusing unit 6 that focus the stimulation-light beam 12 emanating from the radiation sources 5 on the phosphor layer 1. The individual radiation sources 5, for example, light-emitting diodes or laser diodes, are disposed in a row extending perpendicularly to the plane of the figure. The focusing unit 6 has two elongated cylindrical lenses that extend essentially parallel to the individual radiation sources 5 disposed in a row. The divergent stimulation-light beams 12 emanating from the individual radiation sources 5 are focused in the plane of the figure by the focusing device 6 and strike the phosphor layer 1 as a convergent irradiation beam of the stimulation light 3. Perpendicularly to the plane of the figure, the divergent stimulation-light beams 12 of the individual radiation sources 5 are superimposed in such a way that the convergent radiation beam describes a continuous stimulation-light line 13, extending perpendicularly to the plane of the figure, on the phosphor layer 1.

The emission light 7 excited and radiated in the region of the stimulation-light line 13 in the phosphor layer 1 is sensed in a positionally resolved manner by the detector 9. For this purpose, the detector 9 has a multiplicity of photosensitive detector elements 14 that are disposed along a line extending perpendicularly to the plane of the figure. The emission light 7 emitted in the region of the stimulation-light line 13 on the phosphor layer 1 is imaged by means of an imaging unit 8 on the photosensitive detector elements 14 of the detector 9. The detector 9 is preferably constructed as a CCD row or photodiode row.

Preferably suitable as an imaging unit 8 are microlenses that are disposed along a line extending perpendicularly to the plane of the figure and, consequently, parallel to the detector 9 constructed in the form of a row. Alternatively, gradient-index lenses, in particular self-focusing lenses that are likewise disposed in a row extending perpendicularly to the plane of the figure, are also suitable for this purpose.

Preferably, the individual regions 15 are imaged by the imaging unit 8 on the photosensitive areas 14 of the detector 9 on a scale of 1:1.

An optical filter 11 that is transparent in the wavelength range of the emission light 7 and essentially opaque in the wavelength range of the stimulation light can optionally be provided in the beam path between the phosphor layer 1 and the detector 9. This ensures that the sensing of the emission light is not falsified by components of the stimulation light that are reflected at the phosphor layer 1 and are able to reach the detector 9.

In the example shown, the scanner 10 is moved across the stationary phosphor layer 1 in the forward-travel direction V by a transport mechanism (not shown). Different row-type regions 15 of the phosphor layer 1 are successively excited by the stimulation-light line 13, and the emission light 7 emitted in each case being sensed in a positionally resolved manner by the photosensitive detector element 14 of the detector 9.

Preferably, the light source 4 is disposed in front of the detector 9 with respect to the forward-travel direction V, i.e., the scanner 10 travels across the phosphor layer 1 with the light source 4 ahead of it. This achieves the result that a greater proportion of the stimulation light 3 scattered in the phosphor layer is scattered in the direction of the regions 15 already read out, while only a small proportion of the stimulation light 3 is scattered in the direction of regions 15 of the phosphor layer 1 that have not yet been read out. As a result, intensity and sharpness losses due to a scattering of the stimulation light 3 within the phosphor layer 1 are reduced.

In the example shown, the scanner 10 is moved across a stationary phosphor layer 1. Of course, the above comments are, however, also applicable if the scanner 10 is stationary and the phosphor layer 1 situated on the base layer 2 is transported relative to the scanner 10 in the movement direction P. The same applies analogously for configurations in which both the scanner 10 is moved in the forward-travel direction V and the phosphor layer 1 is moved in the movement direction P.

While the scanner 10 is moved in the forward-travel direction V relative to the phosphor layer 1, the stimulation-light line 13 scans individual regions 15 of the phosphor layer 1 and excites them consecutively to emit emission light 7 that is sensed by the detector 9 for each of the individual regions 15.

The detector 9 needs a forward-travel time $T_V$ to move by the width of a region 15. In the course of the movement, the photosensitive areas 14 of the detector 9 sense the emission light 7 emitted by the region 15 during an integration time $T_I$.

The width of the regions 15 in the forward-travel direction V is typically between about 10 µm and 500 µm. The transverse extension of the photosensitive areas 14 of the detector 9 perpendicular to the direction of the detector row is typically between about 10 µm and 500 µm.

Preferably, the transverse extension of the photosensitive areas 14 is greater than the width of the region 15 in the forward-travel direction V. For example, the width of the regions 15 is about 50 µm, while the transverse extension of the photosensitive areas 14 is about 400 µm. The width of an individual region 15 in the forward-travel direction V is determined in this case by the width of the segment of the phosphor layer 1 that the stimulation-light line 13 excites to emit emission light 7 during its forward travel in the forward-travel direction V during the forward-travel time $T_V$. The positional resolution in the forward-travel direction V, i.e., the smallest possible width of an individual region 15 is determined in this connection by the width of the stimulation-light line 13 in the forward-travel direction V.

For the purpose of better illustration, the regions 15 of the phosphor layer 1 and the photosensitive areas 14 of the detector 9 are each shown in FIG. 1 considerably enlarged and not true to scale.

According to the invention, the integration time $T_I$, is shorter than the forward-travel time $T_V$, i.e., $T_I < T_V$. This reduces the thermally generated dark noise compared with the methods disclosed in the prior art and, consequently, improves the signal/noise ratio overall. Since the detector 9 when sensing the emission light 7 scans, during the integration time $T_I$, only a small part of the width of the region 15, losses of information that are due to the so-called movement-induced blurring are also reduced. This is explained in greater detail below together with the FIGS. 2 and 3.

Figure 2:
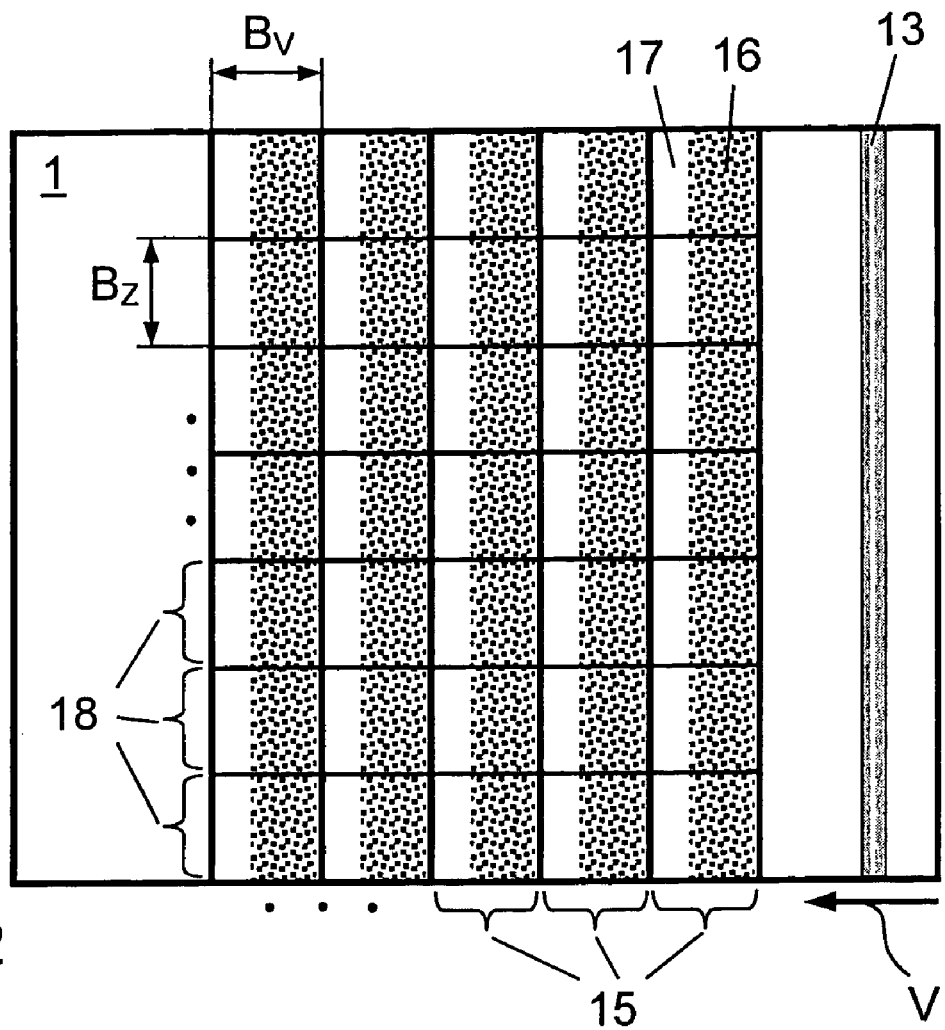
FIG. 2 shows a phosphor layer to be read out in plan view.

FIG. 2 shows a phosphor layer 1 to be read out in plan view. As in the case of FIG. 1, the individual regions 15 of the phosphor layer 1 are also shown in the representation chosen here considerably enlarged for reasons of better clarity.

Drawn on the phosphor layer 1 is a stimulation-light line 13. The stimulation-light line 13 is moved with the light source 4 and the detector 9, including the imaging unit 8 and the filter 11 (see FIG. 1), in the forward-travel direction V relative to the phosphor layer 1 to scan the individual regions 15. To move by the width of a region 15, the detector 9 or the stimulation-light line 13 needs a certain forward-travel time $T_V$ that is equal to, in the case of a constant forward-travel speed, the ratio of the width $B_V$ of the individual regions 15 and the forward-travel speed.

The light source 4 is controlled in such a way that only a first subregion 16 in each of the regions 15 is directly irradiated with stimulation light, whereas a second subregion 17 of the regions 15 is not irradiated directly with stimulation light. In this connection, the light source 4 only emits stimulation light if the stimulation-light line 13 is scanning the first subregion 16. The light source 4 is then switched off, with the result that a now "virtual stimulation-light line" scans the second subregion 17 without irradiating it with stimulation light. Accordingly, only the first subregion 16 is excited by direct irradiation with stimulation light to emit emission light. The second subregion 17, on the other hand, is excited to emit emission light by the stimulation light incident on the first subregion 16 and scattered partly in the forward-travel direction V in the phosphor layer 1.

In this connection, the light source 4 is controlled by setting a stimulation time $T_S$ during which the light source 4 is switched on when the stimulation-light line 13 moves across a region 15. After the expire of the stimulation time $T_S$, the light source 4 then remains switched off until the stimulation-light line 13 has reached the next region 15 to be read out at which the irradiation cycle described can begin again by switching on the light source 4.

The aperture of the detector 9, which depends on the extension of the photosensitive areas 14 of the detector 9 and also on the imaging unit 8, likewise consecutively scans during this process the individual excited regions 15 of the phosphor layer 1. The photosensitive areas 14 of the detector 9 disposed in a row sense, during this process, the emission light 7 emitted by each of the row-type regions 15.

The detector 9 is controlled during this process in such a way that it senses the emission light 7 emitted by the region 15 only during an integration time $T_I$. According to the invention, the integration time $T_I$, is in this case shorter than the forward-travel time $T_V$ that the detector 9 or the light source 4 needs in order to traverse a distance in the forward-travel direction V equal to the width $B_V$ of the regions 15. The integration time $T_I$, is preferably synchronized with the stimulation time $T_S$, i.e., the integration time $T_I$, and the stimulation time $T_S$ begin at the same time instant and have the same duration.

Compared with the methods disclosed in the prior art in which the integration time is identical to the forward-travel time, the inventive shortening of the integration time compared with the forward-travel time results in a markedly reduced dark noise. Since the aperture of the detector 9 consequently scans a segment of the region 15, which segment is narrower in the forward-travel direction V, when sensing the emission light during the shorter integration time, the movement-induced blurring and consequently a loss of information resulting therefrom during reading out is reduced at the same time.

In addition, as can be seen in FIG. 2, the individual regions 15 are each subdivided into a multiplicity of individual elements 18. This subdivision is achieved by sensing the emission light emitted by the row-type regions 15 with a detector 9 constructed in the form of a row, the width $B_Z$ of the elements 18 being equal to the extension of the individual photosensitive detector elements 14 in the row direction of the detector 9. The width $B_Z$ of the elements 18 is typically between about 10 μm and 500 μm, preferably about 50 μm.

The emission light 7 emitted by the individual elements 18 and sensed in rows by the corresponding photosensitive areas 14 of the detector 9 is converted in the detector 9 into equivalent detector signals that represent the image information items of the latent X-ray image read out.

Figure 3:
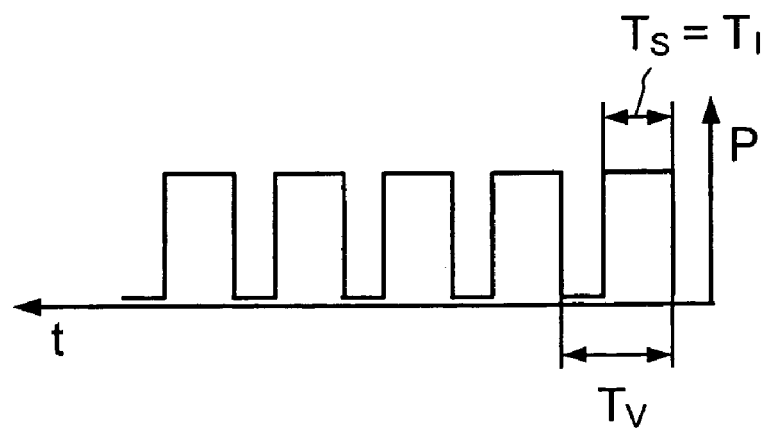
FIG. 3 shows an example of a pulsed signal for controlling the inventive method.

The reading-out of the phosphor layer 1 is preferably controlled by a pulsed signal. FIG. 3 shows an example of such a pulsed signal for controlling the inventive method. The pulse height P is plotted here against time t.

The pulsed signal shown has a cyclic pattern of individual rectangular pulses whose width corresponds to the stimulation time $T_S$ or the integration time $T_I$. The spacing in time between the rising edges of two consecutive pulses is equal in this case to the forward-travel time $T_V$. In the case of the cyclic pulsed signal of the present example, the forward-travel time $T_V$ is consequently equal to the cycle time of the pulsed signal.

In this example, stimulation time $T_S$ and integration time $T_I$, are identical, i.e., the excitation and sensing of the emission light take place synchronously. Alternatively, it is also possible, however, to control the read-out operation with two different pulsed signals that differ in the width of the pulses (i.e., the stimulation time $T_S$ is then different from the integration time $T_I$) and/or the phase position of the pulses relative to one another (i.e., the stimulation time $T_S$ starts at a different time instant from the integration time $T_I$).

The reading-out of the regions 15 of the phosphor layer 1 in FIG. 2 is controlled in detail by the pulsed signal shown in FIG. 3 as follows:

At the time instant of the rising edge of the first pulse, both the light source 4 is switched on and the sensing by the detector 9 of the emission light emitted by region 15 is started. From this time instant onwards, the stimulation time $T_S$ and the integration time $T_I$, synchronized therewith start to run.

During the stimulation time $T_S$ or integration time $T_I$, the stimulation-light line 13 scans the first subregion 16 of the region 15 and the emission light emitted is sensed by the detector 9.

When the stimulation time $T_S$ or integration time $T_I$, expires, the stimulation-light line 13 has arrived at the second subregion 17 of the region 15. At this time instant, the second subregion 17 is excited by stimulation light that is scattered in the phosphor layer 1 into the second subregion 17 from the directly irradiated first subregion 16. The emission light emitted by the second subregion 17 is therefore concomitantly sensed by the detector 9 even before the expire of the integration time $T_I$. Starting from the time instant of the falling edge of the first pulse, the light source 4 and the detector 9 are switched off and moved further in the forward-travel direction V until the forward-travel time $T_V$ has elapsed.

After the forward-travel time $T_V$ has elapsed, the process described starts again for the region 15 to be read out next.

Preferably, the stimulation time $T_S$ or the integration time $T_I$, is about 50% to 95% of the forward-travel time $T_V$. This achieves a marked improvement in the signal/noise ratio accompanied at the same time by reduced movement-induced blurring. In addition, it ensures that the second subregion 17 is still narrow enough to be excited completely by the stimulation light scattered in the first subregion 16 of the phosphor layer 1.

We claim:

1. A method of reading out information items stored in a phosphor layer in which
   the phosphor layer is excited to emit emission light by a light source emitting stimulation light, the light source being moved relative to the phosphor layer,
   the emission light is sensed by a detector, and
   the detector is moved relative to the phosphor layer to consecutively sense the emission light emitted from individual regions in the phosphor layer, the individual regions of the phosphor layer being successively irradiated with the stimulation light and excited to emit the emission light,
   wherein
   the detector senses the emission light emitted from a region in the phosphor layer during an integration time $(T_I)$ that is less than a forward-travel time $(T_V)$ required for relative movement of the detector by a width $(B_V)$ of the region in a forward-travel direction (V) and a first subregion of each region is irradiated with stimulation light and a second subregion of each region is excited by stimulation light scattered in the phosphor layer to emit emission light.

2. The method as claimed in claim 1, wherein the phosphor layer is excited to emit emission light in the region during a stimulation time $(T_S)$.

3. The method as claimed in claim 2, wherein the stimulation time $(T_S)$ is shorter than the forward-travel time $(T_V)$.

4. The method as claimed in claim 3, wherein the stimulation time $(T_S)$ is equal to the integration time $(T_I)$.

5. The method as claimed in claim 2, further comprising controlling the stimulation time (TS) to enable both the first subregion and the second subregion to be substantially completely read out and emit the emission light.

6. The method as claimed in claim 2, further comprising adjusting a pulse width governing the stimulation time (TS) to enable both the first subregion and the second subregion to be completely read out and emit the emission light.

7. The method as claimed in claim 1, wherein at least one of the detector and the light source for emitting stimulation light is moved relative to the phosphor layer at a constant forward-travel speed.

8. The method as claimed in claim 7, wherein the forward-travel time ($T_V$) is equal to a ratio of the width ($B_V$) of the region and the forward-travel speed.

9. The method as claimed in claim 1, wherein the sensing of the emission light emitted by the regions in the phosphor layer or the irradiation of the phosphor layer in the regions with stimulation light is controlled by a pulsed signal (P), the integration time ($T_I$) or the stimulation time ($T_S$) being determined by a pulse width of individual pulses of the pulsed signal (P).

10. The method as claimed in claim 9, wherein the forward-travel time ($T_V$) is determined by a time duration between identical edges of two consecutive pulses of the pulsed signal (P).

11. The method as claimed in claim 1, wherein the regions in the phosphor layer each have the form of a row, and wherein at least one of the detector and the light source for emitting stimulation light are moved perpendicularly to a longitudinal extension of the row relative to the phosphor layer.

12. A device for reading out information items stored in a phosphor layer, comprising:
a light source generating stimulation light to excite the phosphor layer to emit emission light, the light source being moved relative to the phosphor layer, and
a detector for sensing the emission light, the detector moving relative to the phosphor layer to consecutively sense the emission light emitted from individual regions in the phosphor layer, the individual regions of the phosphor layer being successively irradiated with the stimulation light and excited to emit the emission light, wherein the detector senses the emission light emitted from a region in the phosphor layer during an integration time that is less than a forward-travel time required for movement of the detector, relative to the phosphor layer, by a width of the region in a forward-travel direction, and wherein a first subregion of each region is irradiated with stimulation light and a second subregion of each region is excited by stimulation light scattered in the phosphor layer to emit emission light.

13. The device as claimed in claim 12, wherein the phosphor layer is excited to emit emission light in the region during a stimulation time.

14. The device as claimed in claim 13, wherein a pulse width driving the light source is controlled to provide the stimulation time that enables both the first subregion and the second subregion to be substantially completely read out and emit the emission light.

15. The device as claimed in claim 13, wherein a pulse width driving the light source is controlled to provide the stimulation time that enables both the first subregion and the second subregion to be completely read out and emit the emission light.

16. The device method as claimed in claim 12, wherein the stimulation time is shorter than the forward-travel time.

17. The device as claimed in claim 16, wherein the stimulation time is equal to the integration time.

18. The device as claimed in claim 12, wherein at least one of the detector and the light source for emitting stimulation light is moved relative to the phosphor layer at a constant forward-travel speed.

19. The device as claimed in claim 18, wherein the forward-travel time is equal to a ratio of the width of the region and the forward-travel speed.

20. The device as claimed in claim 12, wherein the sensing of the emission light emitted by the regions in the phosphor layer or the irradiation of the phosphor layer in the regions with stimulation light is controlled by a pulsed signal, the integration time or the stimulation time being determined by a pulse width of individual pulses of the pulsed signal.

21. The device as claimed in claim 20, wherein the forward-travel time is determined by a time duration between identical edges of two consecutive pulses of the pulsed signal.

22. The device as claimed in claim 12, wherein the regions in the phosphor layer each have the form of a row, and wherein at least one of the detector and the light source for emitting stimulation light are moved perpendicularly to a longitudinal extension of the row relative to the phosphor layer.

* * * * *